3,006,893
PHENOLIC RESINS

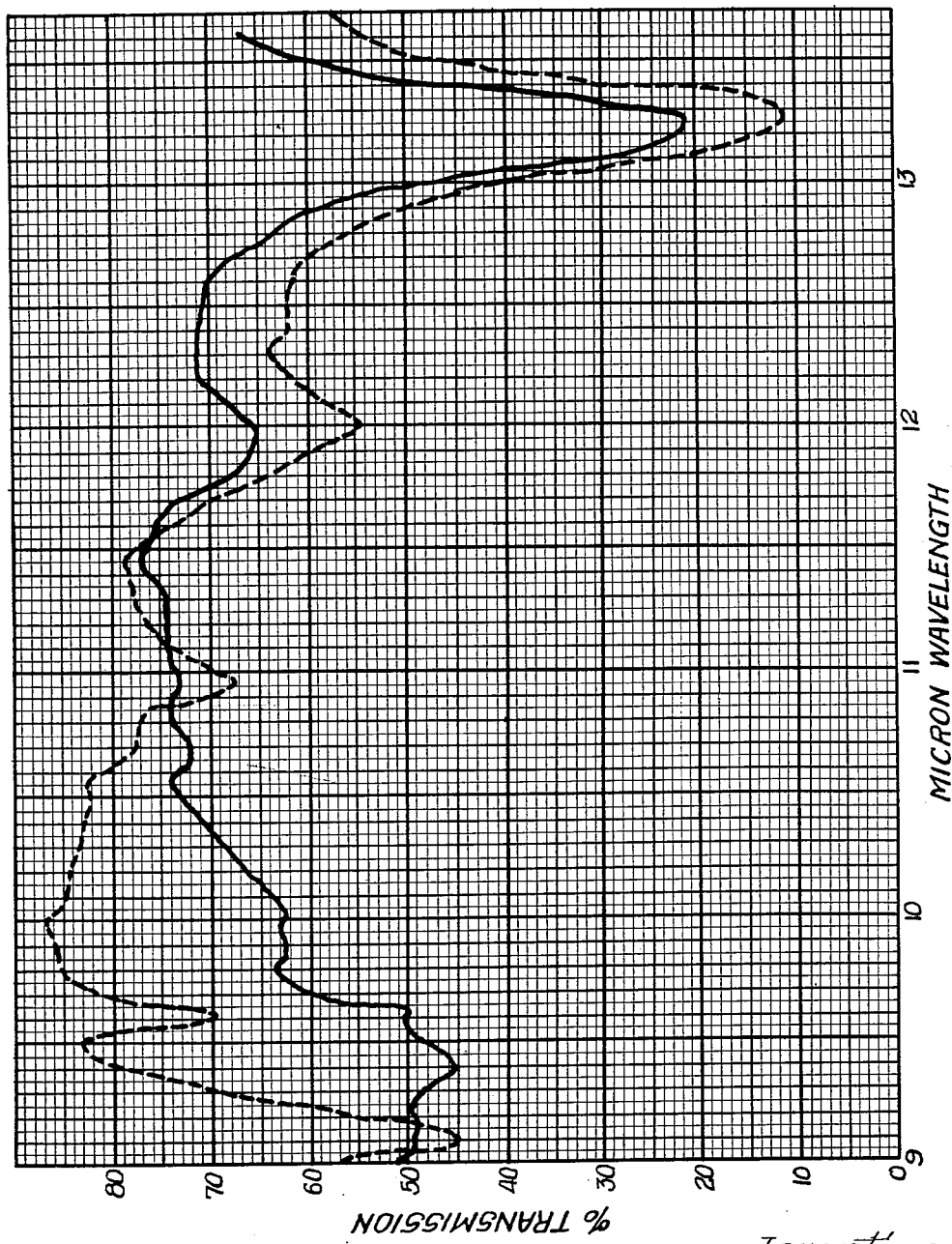

Charles P. West, Metuchen, and Howard H. Leiner, New Brunswick, N.J., and Ronald Saltzman, Brooklyn, N.Y., assignors to American Potash and Chemical Corporation, New York, N.Y., a corporation of Delaware
Filed Mar. 26, 1959, Ser. No. 802,254
16 Claims. (Cl. 260—57)

The present invention relates to new phenolic resins and the process by which these resins are prepared. More specifically, the present invention is directed to the catalytic control of the molecular structure of phenolic resins to produce resins of improved properties which exhibit fast curing characteristics and adequate and even improved mechanical properties, the characteristics and properties particularly adapting the resins for use in the forming of molded plastic products.

Phenolic resins of the "novolac" type are widely used in the plastic molding industry. These resins are phenol-ended chain polymers in which the phenolic nuclei are joined by methylene bridges located at the ortho and para positions relative to the phenolic hydroxyl groups. Such resins are permanently soluble and thermoplastic and cure to insoluble, infusible products upon the addition of a source of formaldehyde such as hexamethylenetetramine or paraform. The resins are of adequate hardness (softening point about 60° C.) to permit grinding thereof for the preparation of a molding powder. The resins exhibit good overall curing properties including a fast rate of cure and attain an acceptable strength upon being cured. A "novolac" resin is referred to as a two-stage resin as the first stage of preparation consists generally of the forming of the soluble and thermoplastic resin by reacting phenol with formaldehyde, and the second stage constitutes the curing stage during which adequate additional formaldehyde is reacted with the "novolac."

In the first stage of "novolac" resin preparation, acid and metal oxide catalysts have been used to form a commercially suitable resin. Bender et al. in their Patent No. 2,475,587 illustrate the rapid cure rate which is attained with a metal oxide catalyzed "novolac" resin. The Bender et al. resins are noted at the present time for their rapid curing rates as compared with other types of phenolic resins. The curing times of these resins may be as low as 80 seconds when cured at 1000 p.s.i. at 300° F. with the resin to wood flour filler ratio being about 1 to 7. The increase in cure rate has been attributed by Bender et al. to the presence of a major proportion of 2,2'-ortho isomer in the resin.

As generally recognized, there are three main isomers formed by the condensation of phenol with formaldehyde. These isomers are:

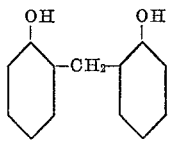

2,2'-dihydroxydiphenylmethane

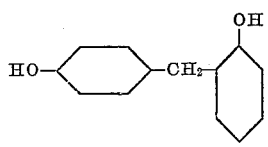

2,4'-dihydroxydiphenylmethane

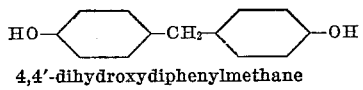

4,4'-dihydroxydiphenylmethane

It is generally accepted that conventional acidic catalysts produce resins with a predominance of 4,4' linkages although small quantities of 2,4', and 2,2' linkages are also formed. Acid catalyzed resins have not been found fully acceptable where fast curing resins are required as the predominance of 4,4' linkages result in random orientation of the molecules. However, with a prodominance of 2,2' linkages the resin derived will have a more ordered linearity in structure. The phenolic nuclei exhibit a cis-orientation to an extent that there is intramolecular bonding between the hydroxyl groups providing for further stabilization of the resin chains. Such resins will cure faster and theoretically in a more ordered fashion producing products of improved mechanical properties.

Infra-red spectroscopy is used to detect the various linkages both qualitatively and quantitatively in a resin. For example, it has been established that the 13.2 micron absorption band provides a qualitative and quantitative analysis of the functional groups having 2,2' linkages. The 12.2 micron absorption band indicates the presence of 2,4' linkages. Accordingly, a study of the infra-red spectra of a given resin will provide a means of identification of the resin insofar as a variation in functional groups present is concerned.

It is an object of the present invention to provide new phenolic resins capable of rapid curing and which in their cured form exhibit adequate and even improved mechanical properties.

A further object is to provide a process by which new and improved phenolic resins are formed, the process including the use of a special type of resinification catalyst which promotes and controls polymerization in a novel manner.

Still a further object is to provide new phenolformaldehyde fast curing resins and process for forming the same, the polymerization reaction being controlled by the presence of a rare earth catalyst.

Other objects not specifically set forth will become apparent from the following detailed description of the invention.

We have found that rare earth catalyzed phenolic resins exhibit new and improved properties particularly in connection with the rate of cure of such resins. It has been established by infra-red spectra analysis that rare earth catalysis influences the molecular structure of phenolic resins in a heretofore unknown manner. In the infra-red spectra of these resins within the 9.0 to 14.0 micron range of light transmission, major intermolecular bonds appear at 9.4, 12.0 and 13.2 microns. When the resin is blended with a suitable curing agent and filler, the blend may be cured at a very fast rate with the resultant product exhibiting adequate or even improved mechanical properties while also being visually flawless in structure. Actually, it has been found that substantially faster cure times are possible with the rare earth catalyzed resins, such times being substantially shorter than those of the "fast cure novolacs" now commercially available. The catalytic control of the molecular structure of the phenolic resins afforded by a rare earth catalyst can be utilized in producing a resin which exhibits improved properties including faster and improved cure characteristics as well as mechanical properties which are either equivalent to or surpass the properties of "fast cure novolacs."

In studying the molecular linkage characteristics of rare earth catalyzed phenolic resins by infra-red absorption analysis, it has been established that the 2,2' isomer content is substantial and is on the order of the 2,2' isomer content of commercial "fast cure novolacs" of the type disclosed by Bender et al. However, comparative infra-red spectra studies clearly illustrate a substantial molecular structural difference existing between the two differently prepared phenolic resins. Still further, it has been found that faster cure times are possible with rare earth catalyzed resins without accompanying loss of essential mechanical properties and, in certain instances, even accompanied by improved mechanical properties. The results of the studies conducted fairly indicate that the rare earth catalyzed phenolic resins include a different molecular structural arrangement which in and of itself is capable of substantially increasing the curing rate without detriment to the overall final physical properties of the molded article.

The following examples are illustrative of phenolic resins formed in accordance with the teachings of the present invention, it being understood that these examples are not to be considered limiting to the scope of the invention.

*Example 1*

Rare earth acetate was used as a catalyst in preparing a phenolic resin. The acetate as used in this example and as used hereinafter was prepared by reacting a commercial rare earth carbonate mixture with an aqueous acetic acid solution and crystallizing out the resulting rare earth acetate product. Commercial salts of rare earths are available as mixtures comprising approximately 50% cerium, 25% lanthanum and the balance a mixture of other rare earths, principally neodymium and praseodymium. The following mixture was charged into a reaction vessel with the pH of the mixture before charging being 5.2.

|  | Grams | Moles |
| --- | --- | --- |
| Phenol | 433.0 | 4.6 |
| Formalin (37% formaldehyde) | 373.0 | 4.6 |
| Rare Earth Acetate | 4.3 | |

The mixture was heated in the vessel to reflux (99°–100° C.) with reflux temperature being reached in 30 minutes. The reflux temperature was maintained for one hour and at the end of this period a Dean-Stark trap was introduced and water was taken off for one hour at the refluxing temperature. Vacuum distillation followed to remove the remaining water and excess phenol, this distillation being continued out at 1.5 cm. Hg until a temperature of 155° C. was reached. The resulting resin had a softening point of 83° C. (determined here and below by the ball and ring method—ASTM–E–28–51T) and upon infra-red spectra analysis exhibited the transmission characteristics illustrated in solid line in the accompanying drawing. The solid line curve in the drawing is representative of infra-red light transmission characteristics of the new resins of the present invention, the curve being borne out by standard analysis of numerous test specimens.

The phenolic resin was then compounded for molding as follows:

| | Grams |
| --- | --- |
| Resin | 100.0 |
| Hexamethylenetetramine | 12.0 |
| Hi Sil 233 (calcium silicate anti-caking agent) | 2.0 |
| Zinc stearate (mold release agent) | 4.8 |

The molding compound was prepared by pulverizing the foregoing ingredients in a suitable mill used for such purposes with the pulverized compound then being blended with wood flour in the following proportions:

| | Grams |
| --- | --- |
| Wood flour | 610.0 |
| Resin compound | 87.5 |
| Zinc stearate | 1.7 |

Squares of 5" x 5" x ¼" were molded with a density of 0.9 under a pressure of 1000 p.s.i. The minimum cure time of each square was checked at 300° F. with this cure time being specified as minimum time in which a homogeneous product without blisters, cracks or other mechanical flaws could be obtained. With certain of the squares, the cure time was extended as an indication of the achievement of maximum physical properties with respect to cure time. The square articles were then tested for flexural strength and moduli of elasticity according to ASTM–D–780–49T. The following properties were recorded:

| Cure Time (seconds) | Flexural Strength (p.s.i.) | Modulus of Elasticity (p.s.i.) |
| --- | --- | --- |
| 65 | 3,840 | $4.68 \times 10^5$ |
| 70 | 4,150 | $5.44 \times 10^5$ |
| 75 | 5,420 | $6.07 \times 10^5$ |
| 90 | 5,600 | $5.91 \times 10^5$ |
| 135 | 4,800 | $5.57 \times 10^5$ |

For purposes of comparing the resin formed in Example I, numerous samples of a commercially available "fast cure novolac" phenolic resin were analyzed by infra-red spectroscopy with the resulting representative spectra graph illustrated in broken line in the drawing. This resin is available from Bakelite Company in a molding composition including filler, curing agent, etc. under the trade designation of "BMM–7000." The molding composition is presently widely used because of its fast cure characteristics and the resin forming a part thereof is presumably metal oxide catalyzed and of the type disclosed by Bender et al. in their above identified patent. The commercial resin was found to have a softening point of 95° C. and was compounded in the same manner as the rare earth catalyzed resin as set forth in Example I. Square articles were then molded in conformance with the procedures set forth in Example I and the following properties of several articles subjected to variable rates of cure including a minimum cure time were noted.

| Cure Time (seconds) | Flexural Strength (p.s.i.) | Modulus of Elasticity (p.s.i.) |
| --- | --- | --- |
| 80 | 3,620 | $5.56 \times 10^5$ |
| 85 | 4,270 | $5.60 \times 10^5$ |
| 90 | 4,440 | $5.50 \times 10^5$ |
| 105 | 3,170 | $4.61 \times 10^5$ |
| 120 | 3,380 | $4.52 \times 10^5$ |
| 180 | 3,650 | $4.50 \times 10^5$ |

In comparing the cure times and physical properties of the two different types of phenolic resins, it will be noted that the rare earth catalyzed resin was capable of a faster rate of cure with a very definite balancing of resultant physical properties if not an improvement therein. The minimum cure time of the rare earth catalyzed resin was 65 seconds as compared to the minimum cure time of 80 seconds of the commercial resin. The difference of 15 seconds is appreciable and is of considerable importance in the plastic molding industry.

A comparison of the infra-red spectra of the two different resins is of considerable interest. In first considering broken line graph of the commercial resin, it will be noted that the 9.1 and 9.6 micron bands are quite distinct. The 11.0, 12.0 and 13.2 micron bands are also distinct with the latter band being substantially dominant. The spectra characteristics exhibited at the 13.2 micron band are typical of a phenolic resin containing a relatively high proportion of 2,2' linkages. The percent transmission difference between the 12.0 and 13.2 bands is 43%, this difference being a measure of the 2,2' linkage predominance. The fast cure time of the commercial resin has been attributed by its inventors to the predominance of 2,2' linkages.

The rare earth catalyzed resin spectra is similar to that of the commercial resin in the respect that the 12.0 and 13.2 micron bands are present with a substantial dominance of the 13.2 band indicating a large proportion of 2,2' linkages. The percent difference is 44% which is exactly comparable to the commercial or standard resin. However, it will be noted, that there is an absence of a sharp 9.1 micron band and a complete absence of the 11.0 micron band, as compared with the standard resin spectra, and that there is a definite presence of the 9.4 micron band. The comparative differences existing between the two resins as exemplified by the individual infra-red spectra analysis is conclusive in establishing the fact that the rare earth catalyzed polymeric molecular structure differs substantially from the molecular structure of the standard commercial resin. Furthermore, the increased rate of cure and retention of or improvement in mechanical properties of the rare earth catalyzed resin established the desirability of the existing differences in molecular structure.

The qualitative identification of isomeric structures by use of infra-red analysis is well known. The graphs of the drawing were obtained by use of a Perkin-Elmer Model 21 spectraphotometer. This is a double-beam instrument which records directly the transmittance versus wavelength. The analysis was limited to the 9–15 micron region of the spectrum as this region is the one of importance since the different types of aromatic substitution produce characteristic absorption bands in this region. The procedure used in preparing spectraphotometer samples is described in Dinsmore and Smith, "The Analysis of Natural and Synthetic Rubber by Infra-Red Spectra," NRL Report, page 2861, August, 1946. The sample is dissolved in acetone with the resulting solution being spread uniformly over a rock salt plate. The solvent is then removed by normal evaporation at room temperature. The principal criterion for satisfactory film thickness is that the transmittance of the 9.0 micron band in the spectrum should fall in the 50–60% interval.

The following examples are illustrative of additional phenolic resins prepared by rare earth catalysis with the resulting infra-red spectra analysis of each resin conforming with the solid line graph in the drawing. In essence, the individual infra-red spectra of the various resins clearly establish the presence of the 9.4, 12.0 and 13.2 micron bands with a large percentage difference between the 13.2 and 12.0 bands and with the absence of the 9.1, 9.6 and 11.0 micron bands.

*Example II*

A phenolic resin was prepared by charging a reaction vessel with the following ingredients:

|  | Grams | Moles |
|---|---|---|
| Phenol | 517.0 | 5.50 |
| Formalin (37% formaldehyde) | 370.2 | 4.56 |
| Rare Earth Acetate | 11.4 | |

The reaction mixture had an adjusted pH of 5.0 controlled by the addition of HCl. The mixture was heated to reflux (102° C.) and maintained at this temperature for one hour. Atmospheric distillation followed for one hour resulting in the raising of the temperature to 110° C. Vacuum was applied and continued up to 145° C. at 2.8 cm. Hg, the resulting resin having a softening point of 76° C.

A molding material was made from the resin in accordance with the procedure set forth in Example I. The following properties were noted:

| Cure Time (seconds) | Flexural Strength (p.s.i.) | Modulus of Elasticity (p.s.i.) |
|---|---|---|
| 75 | 2,940 | 4.82×10$^5$ |
| 80 | 4,004 | 6.01×10$^5$ |
| 90 | 3,730 | 4.90×10$^5$ |

*Example III*

A reaction mixture was prepared as follows:

|  | Grams | Moles |
|---|---|---|
| Phenol | 564.0 | 6.0 |
| Formalin (45% formaldehyde) | 400.2 | 6.0 |
| Rare Earth Acetate | 11.3 | |

The pH of the mixture was adjusted with HCl to 5.0 and the mixture was then charged into a reaction vessel. The vessel contents were brought to reflux (100°–103° C.) and maintained for one hour. Atmospheric distillation was employed to raise the reaction temperature to 120°–125° C. which required one hour and 10 minutes. Reaction temperature was maintained for one hour. Vacuum was then applied and distillation continued to a temperature of 155° C. under 2.3 cm. Hg. The resulting resin had a softening point of 108° C.

A molding material was prepared from the resin as set forth in Example I and the following properties of the cured resin were noted:

| Cure Time (seconds) | Flexural Strength (p.s.i.) | Modulus of Elasticity (p.s.i.) |
|---|---|---|
| 70 | 2,185 | 3.44×10$^5$ |
| 75 | 2,274 | 5.08×10$^5$ |
| 80 | 3,833 | 5.07×10$^5$ |
| 90 | 3,084 | 4.41×10$^5$ |
| 105 | 2,966 | 3.26×10$^5$ |

*Example IV*

A resin was prepared in the same manner as set forth in Example II with the exception that rare earth octoate was used as the rare earth catalyst with the octoate being present in the reaction mixture in a quantity of 11.3 grams. The resulting resin was compounded for molding and curing and the following properties were noted:

| Cure Time (seconds) | Flexural Strength (p.s.i.) | Modulus of Elasticity (p.s.i.) |
|---|---|---|
| 70 | 1,962 | 3.32×10$^5$ |
| 75 | 2,364 | 4.51×10$^5$ |
| 80 | 3,288 | 4.47×10$^5$ |
| 90 | 2,700 | 3.75×10$^5$ |
| 105 | 3,380 | 4.67×10$^5$ |

*Example V*

The following reaction mixture was prepared:

|  | Grams | Moles |
|---|---|---|
| Phenol | 564.0 | 6.0 |
| Formalin (45% formaldehyde) | 400.2 | 6.0 |
| Rare Earth Carbonate | 16.9 | |

The pH of the mixture was 3.9 before charging. The mixture was charged into a reaction vessel and heated to reflux (102°–104° C.) and maintained at reflux temperature for one hour. Atmospheric distillation was employed to raise the reaction temperature to 130°–140° C. over a period of one hour and 45 minutes. Reaction temperature was maintained for one hour. Vacuum was applied and distillation continued to a temperature of 160° C. under 2.3 cm. Hg. The resulting resin had a softening point of 62° C. A molding material was prepared and molded as set forth in Example I. The following properties were noted:

| Cure Time (seconds) | Flexural Strength (p.s.i.) | Modulus of Elasticity (p.s.i.) |
|---|---|---|
| 80 | 2,840 | $4.50 \times 10^5$ |
| 90 | 3,125 | $5.69 \times 10^5$ |
| 105 | 2,787 | $4.15 \times 10^5$ |
| 120 | 2,947 | $4.03 \times 10^5$ |

*Example VI*

The foregoing examples are illustrative of the use of a prepared reaction catalyst. It has been found that the reaction catalyst may be prepared in situ. A resin was prepared utilizing a reaction mixture of phenol, formalin and rare earth mixture. A 1.25 to 1.0 phenol to formaldehyde ratio with 2% rare earth acetate was prepared in situ by the addition of acetic acid. The resulting resin had a melting point of 97° C. and its infra-red analysis conformed with the solid line spectra of the drawing with the resin exhibiting rapid cure characteristics.

The rare earth catalysts include the various salts of rare earths. The term "rare earth salt" is well understood to refer to the salt of a mixture of rare earths comprising approximately 50% cerium, 25% lanthanum and the balance a mixture of other rare earths, principally neodymium and praseodymium. Rare earths are recovered commercially from monazite sands and other sources and for many purposes do not have to be separated into the individual rare earths. That is, for many purposes, including that of the present invention, the natural mixture of rare earths serves as well, or about as well, as the individual earths. For purposes of this invention, the technical grade of the rare earth salts is satisfactory. Various specific individual rare earth combinations, such as cerium and didynium salts, may be used. Any suitable salt may be used such as the acetate, carbonate and octoate (salt of 2-ethylhexoic acid). A suitable molar ratio range of phenol to formaldehyde is 1.0 to 1.5 of phenol to 1.0 of formaldehyde with a 1 to 1 ratio giving excellent results and 1.0 to 1.25 moles phenol for each mole of formaldehyde being preferred. The pH of the reaction mixture should generally range between 4 and 7 preferably between 5.0 to 5.5. The reflux time of the reaction mixture should generally be one hour with distillation at atmospheric pressure preferably taking place up to 110° to 115° C. for one hour. Preferably, reaction temperatures during vacuum distillation should not exceed 155° C.

The molding composition may vary considerably as, for example, 10% resin and 90% filler to 50% resin and 50% filler. The curing agent, such as hexamethylenetetramine, paraformaldehyde, or another source of methylene bridges, will preferably comprise 10% to 15% by weight of the resin. Any adequate phenol-containing source or formaldehyde-supplying reactant may be utilized in carrying out the teachings of the present invention. The resins obtained are generally light brown in lump form and yellow when ground. Their densities are approximately 0.8 to 0.9 g./cc.

In connection with the use of a rare earth carbonate catalyst, the carbonate is preferably present in the reaction mixture at about 3% by weight of the phenol and within the range of 1% to 5%. Rare earth acetate is used in the range of 1% to 5% and preferably in the range of 1% to 2% by weight of the phenol. Rare earth octoate is preferably used in quantities ranging from 1% to 5% by weight of the phenol.

The actual chemical structural formula of the rare earth catalyzed phenolic resins of the present invention is not completely known at the present time. As compared with the metal oxide catalyzed resin prepared in accordance with the teachings of the Bender et al. patent referred to above, the 2,2' linkage content is quite similar. However, the substantial differences in infra-red spectra analysis and cure times can only be explained by the fact that the rare earth catalyzed resins include a molecular structural arrangement which is quite different from the arrangement existing in the commercial resins. It can be theorized that the rare earth catalyzed resins are not true "novolac" resins with this conclusion being borne out by the fact that these resins are not permanently fusible. In other words, the rare earth catalyzed resins cannot be reheated to a virtual thermoplastic state as in the case of a true "novolac" resin. A cure can be obtained in a rare earth catalyzed resin without the presence of an excess of curing agent which is not the case of a true "novolac" resin. These several differences when considered in light of the facts that a faster cure, on the order of 20% to 25% less time, slightly better mechanical properties reflected in tensile and flexural strengths, and quicker development of maximum strengths on curing can be obtained with a rare earth catalyzed resin, provide a clear indication that in classifying such resins with reference to known products they can be considered no more than "quasi-novolacs" or "quasi-resoles" but are neither classical "novolacs" or "resoles." Actually, the material differences in infra-red spectra analysis supports this conclusion. By "resoles" it is meant an earlier stage resin of lower molecular weight which may be liquid, solid or semi-solid.

Obviously certain modifications and variations of the invention as hereinbefore set forth may be made without departing from the spirit and scope thereof, and therefore only such limitations should be imposed as are indicated in the appended claims.

We claim:

1. The process for the preparation of phenolic resins which comprises, reacting phenol with a formaldehyde-supplying resinification agent in the presence of a rare earth salt catalyst under refluxing conditions, said phenol and formaldehyde being present in a molar ratio of from about 1.0 to 1.5 moles phenol for each mole formaldehyde, and removing water produced as a result of the reaction during refluxing.

2. The process for the preparation of phenol-formaldehyde resins which comprises, reacting phenol with formaldehyde in the presence of a rare earth catalyst under refluxing conditions, said phenol and formaldehyde being present in a molar ratio of from about 1.0 to 1.5 moles phenol for each mole formaldehyde, said catalyst being selected from the group consisting of rare earth acetates, carbonates, and octoates, and removing water produced as a result of the reaction during refluxing.

3. The process for the preparation of phenol-formaldehyde resins which comprises, reacting phenol with formaldehyde in the presence of a rare earth salt catalyst under refluxing conditions, said phenol and formaldehyde being present in a molar ratio of from about 1.0 to 1.5 moles phenol for each mole formaldehyde, removing water as a result of the reaction during refluxing, and vacuum distilling the reaction product to remove residual water and any unreacted phenol.

4. The process for the preparation of phenol-formaldehyde resins which comprises, reacting phenol with formaldehyde in the presence of a rare earth salt catalyst under refluxing conditions at a temperature which is no greater than about 110° to 115° C., said phenol and formaldehyde being present in a molar ratio of from about 1.0 to 1.5 moles phenol for each mole formaldehyde, said refluxing conditions being reached within at least about 30 minutes, removing water produced as a result of the reaction during refluxing, and vacuum distilling the reaction product at a temperature which is no greater than about 155° C. to remove residual water and any unreacted phenol.

5. The process for the preparation of phenol-formaldehyde resins which comprises, reacting phenol with formaldehyde in the presence of a rare earth salt catalyst under refluxing conditions at a temperature which is no greater than about 110° to 115° C. for about one hour, said phenol and formaldehyde being present in a molar ratio of from about 1.0 to 1.5 moles phenol for each mole formaldehyde, said refluxing conditions being reached within at least about 30 minutes, removing water produced as a result of the reaction during refluxing, and vacuum distilling the reaction product for about one hour at a temperature which is no greater than about 155° C. to remove residual water and any unreacted phenol.

6. The process for the preparation of phenol-formaldehyde resins which comprises, reacting phenol with formaldehyde in the presence of a rare earth salt catalyst under refluxing conditions at a temperature which is no greater than about 110° to 115° C., said phenol and formaldehyde being present in a molar ratio of from about 1.0 to 1.5 moles phenol for each mole formaldehyde, the pH of the reaction mixture being in the range of from about 4 to 7, removing water produced as a result of the reaction during refluxing, and vacuum distilling the reaction product at a temperature which is no greater than about 155° C. to remove residual water and any unreacted phenol.

7. The process for the preparation of phenol-formaldehyde resins which comprises, reacting phenol with formaldehyde in the presence of a rare earth salt catalyst under refluxing conditions at a temperature which is no greater than about 110° to 115° C. for about one hour, said phenol and formaldehyde being present in a molar ratio of from about 1.0 to 1.25 moles phenol for each mole formaldehyde, the pH of the reaction mixture being in the range of from about 5.0 to 5.5, said refluxing conditions being reached within at least about 30 minutes, removing water produced as a result of the reaction during refluxing, and vacuum distilling the reaction product for for about one hour at a temperature which is no greater than about 155° C. to remove residual water and any unreacted phenol.

8. The process for the preparation of phenol-formaldehyde resins which comprises, reacting phenol with formaldehyde in the presence of a rare earth catalyst under refluxing conditions at a temperature which is no greater than about 110° to 115° C. for about one hour, said phenol and formaldehyde being present in a molar ratio of from about 1.0 to 1.25 moles phenol for each mole formaldehyde, the pH of the reaction mixture being in the range of from about 5.0 to 5.5, said refluxing conditions being reached within at least about 30 minutes, removing water produced as a result of the reaction during refluxing, and vacuum distilling the reaction product for about one hour at a temperature which is no greater than about 155° C. to remove residual water and any unreacted phenol, said catalyst being selected from the group consisting of rare earth acetates, carbonates, and octoates.

9. The process for the preparation of phenol-formaldehyde resins which comprises, reacting phenol with formaldehyde in the presence of a rare earth acetate catalyst under refluxing conditions at a temperature which is no greater than about 110° to 115° C. for about one hour, said phenol and formaldehyde being present in a molar ratio of from about 1.0 to 1.5 moles phenol for each mole formaldehyde and said catalyst being present in quantities ranging from about 1% to 5% by weight phenol, the pH of the reaction mixture being in the range of from about 4 to 7, said refluxing conditions being reached within at least about 30 minutes, removing water produced as a result of the reaction during refluxing, and vacuum distilling the reaction product for about one hour at a temperature which is no greater than about 155° C. to remove residual water and any unreacted phenol.

10. The process for the preparation of phenol-formaldehyde resins which comprises, reacting phenol with formaldehyde in the presence of a rare earth carbonate catalyst under refluxing conditions at a temperature which is no greater than about 110° to 115° C. for about one hour, said phenol and formaldehyde being present in a molar ratio of from about 1.0 to 1.5 moles phenol for each mole formaldehyde and said catalyst being present in quantities ranging from about 1% to 5% by weight phenol, the pH of the reaction mixture being in the range of from about 4 to 7, said refluxing conditions being reached within at least about 30 minutes, removing water produced as a result of the reaction during refluxing, and vacuum distilling the reaction product for about one hour at a temperature which is no greater than about 155° C. to remove residual water and any unreacted phenol.

11. The process for the preparation of phenol-formaldehyde resins which comprises, reacting phenol with formaldehyde in the presence of a rare earth octoate catalyst under refluxing conditions at a temperature which is no greater than about 110° to 115° C. for about one hour, said phenol and formaldehyde being present in a molar ratio of from about 1.0 to 1.5 moles phenol for each mole formaldehyde and said catalyst being present in quantities ranging from about 1% to 5% by weight phenol, the pH of the reaction mixture being in the range of from about 4 to 7, said refluxing conditions being reached within at least about 30 minutes, removing water produced as a result of the reaction during refluxing, and vacuum distilling the reaction product for about one hour at a temperature which is no greater than about 155° C. to remove residual water and any unreacted phenol.

12. Phenolic resins having infra-red spectra characterized by the presence of a 9.4 micron band in addition to the normally occurring 12.0 and 13.2 micron bands, said resins having been prepared by the condensation of phenol-formaldehyde in the presence of a rare earth salt catalyst, said phenol and formaldehyde having been present in a molar ratio of from about 1.0 to 1.5 moles phenol for each mole formaldehyde.

13. Phenol-formaldehyde resins having infra-red spectra characterized by the presence of a 9.4 micron band in addition to a major 13.2 micron band, said resins having been prepared by the condensation of phenol-formaldehyde in the presence of a rare earth salt catalyst, said phenol and formaldehyde having been present in a molar ratio of from about 1.0 to 1.5 moles phenol for each mole formaldehyde.

14. Phenol-formaldehyde resins having infra-red spectra characterized by the presence of the 9.4, 12.0, and 13.2 micron bands, with the complete absence of the 11.0 micron band and absence of a sharp 9.1 micron band, said resins having been prepared by the condensation of phenol-formaldehyde in the presence of a rare earth salt catalyst, said phenol and formaldehyde having been present in a molar ratio of from about 1.0 to 1.5 moles phenol for each mole formaldehyde.

15. Phenol-formaldehyde resins having infra-red spectra characterized by the presence of the 9.4, 12.0 and 13.2 micron bands, with the complete absence of the 11.0 micron band and absence of a sharp 9.1 micron band, the 13.2 micron band establishing a substantially lower percent transmission than the 12.0 micron band, said resins having been prepared by the condensation of phenol-formaldehyde in the presence of a rare earth salt catalyst, said phenol and formaldehyde having been present in a molar ratio of from about 1.0 to 1.5 moles phenol for each mole formaldehyde.

16. Phenol-formaldehyde resins having infra-red spectra characterized by the predominance of the 9.4 micron band and those bands occurring between 12.0 and 13.2 microns inclusively, with the substantial to complete absence of the 9.1 and 11.0 micron bands, the 13.2 micron band establishing a substantially lower percent transmission than the 12.0 micron band, said resins having been prepared by the condensation of phenol-formaldehyde in the presence of a rare earth salt catalyst, said phenol and formaldehyde having been present in a molar ratio of from about 1.0 to 1.5 moles phenol for each mole formaldehyde.

References Cited in the file of this patent

UNITED STATES PATENTS

| | | |
|---|---|---|
| 2,754,335 | Bender | July 10, 1956 |
| 2,809,178 | Turner et al. | Oct. 8, 1957 |
| 2,886,554 | Schlenker | May 12, 1959 |